United States Patent

[11] 3,617,963

| [72] | Inventors | Raymond F. De Both<br>Broadview, Ill.;<br>Albert M. Anthony, Conneaut, Ohio |
|---|---|---|
| [21] | Appl. No. | 85 |
| [22] | Filed | Jan. 2, 1970 |
| [45] | Patented | Nov. 2, 1971 |
| [73] | Assignee | Zenith Radio Corporation<br>Chicago, Ill. |

[54] TEMPERATURE-COMPENSATED STATIC CONVERGENCE APPARATUS
3 Claims, 6 Drawing Figs.

[52] U.S. Cl. .................................................. 335/211,
315/13 C, 335/217
[51] Int. Cl. .................................................... H01f 3/12
[50] Field of Search .......................................... 313/77;
315/13 C; 335/217, 211

[56] References Cited
UNITED STATES PATENTS

| 3,408,520 | 10/1968 | Lindeman | 313/75 |
| 2,791,709 | 5/1957 | Landes et al. | 313/77 |
| 3,555,473 | 1/1971 | Figlewicz et al. | 313/77 X |

*Primary Examiner* — Rodney D. Bennett
*Assistant Examiner* — Brian L. Ribando
*Attorneys* — Francis W. Crotty and Cornelius J. O'Connor ABSTRACT: A temperature-compensated static convergence apparatus for establishing and maintaining a substantially constant magnetic flux field across an electron beam path in a tricolor cathode-ray tube has a primary flux circuit for directing the field of magnetic flux across the beam path. A permanent magnet, which applies a field of magnetic flux to the primary flux circuit, has a flux density that varies inversely with temperature. A flux-permeable compensating member, having a permeability that varies inversely with temperature, is disposed in magnetic coupling relation to the magnet and constitutes a flux loading circuit that diverts a portion of the magnetic flux from the primary flux circuit. The magnet and compensating member collectively establish, at a given temperature, a resultant magnetic flux field of predetermined strength across the electron beam path. Thus, a change in temperature that effects a change in the flux contribution of the magnet simultaneously alters the permeability of the compensating member so as to effect a substantially corresponding offsetting change in the loading effect of the compensator upon the field of the magnet, thereby maintaining the resultant flux field across the beam path at a predetermined strength.

PATENTED NOV 2 1971 3,617,963
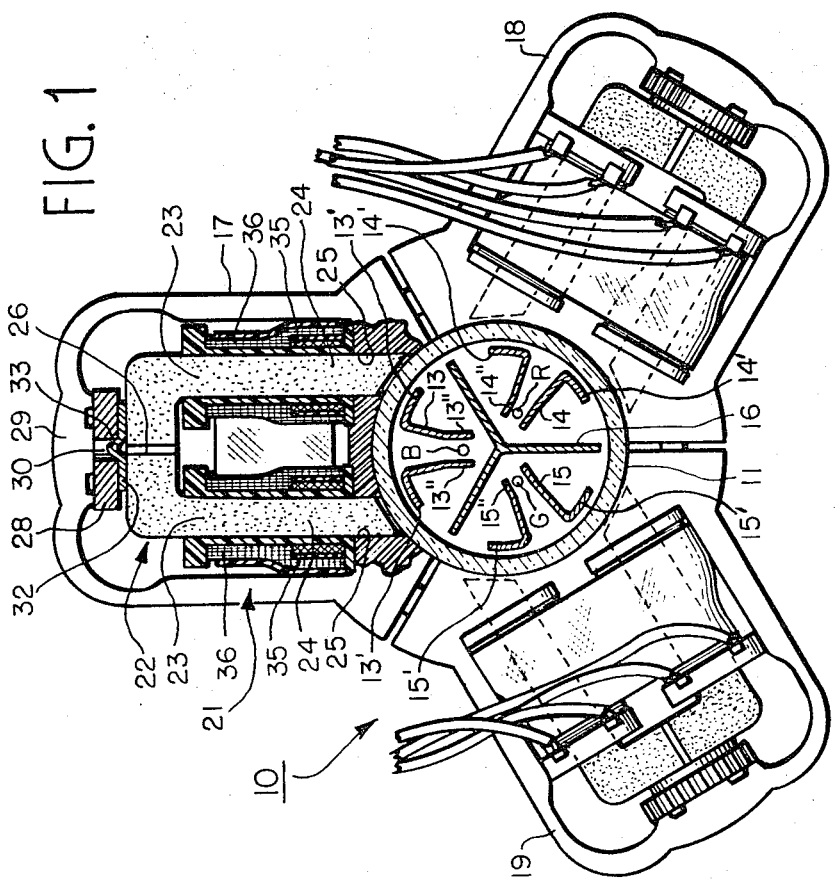
FIG. 1
FIG. 3A FIG. 3B FIG. 3C FIG. 3D
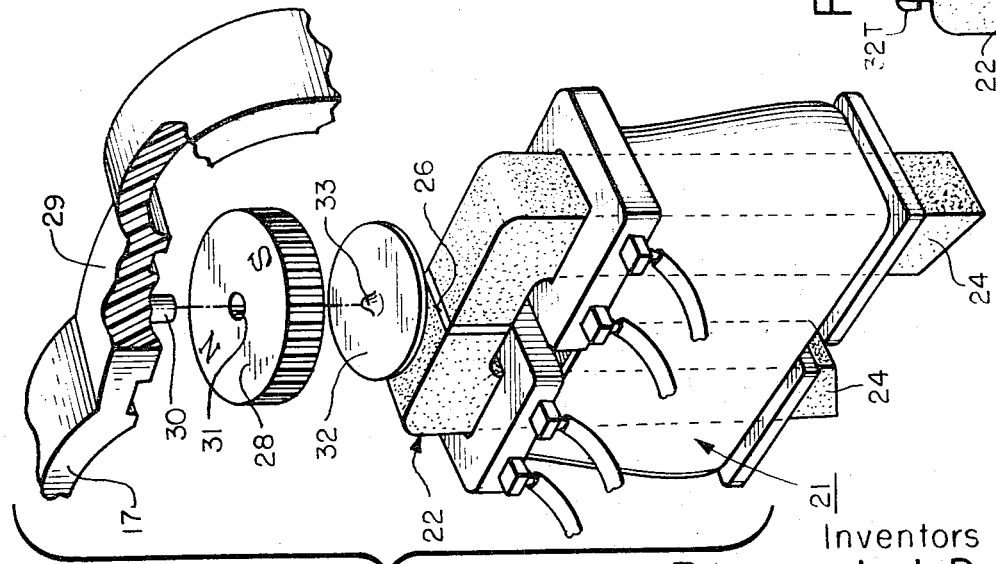
FIG. 2
Inventors
Raymond J. DeBoth
Albert M. Anthony
By Cornelius J. O'Connor
Attorney

TEMPERATURE-COMPENSATED STATIC CONVERGENCE APPARATUS

BACKGROUND OF THE INVENTION

This invention relates, in general, to color television receivers but more particularly to a temperature-compensated static convergence apparatus for use with a tribeam color-reproducing cathode-ray tube.

A cathode-ray tube of the type employed in conventional color television receivers comprises a delta array of electron guns which generate and direct a trio of electron beams toward the target structure of the tube. The target includes a luminescent screen formed of an ordered grouping of red, green and blue phosphor dots which are arranged in a plurality of primary color triads, i.e., each triad is formed of a red, a green and a blue phosphor dot. Disposed adjacent to the screen is a mask having a like plurality of apertures, one in registration with each color triad.

During scansion, the three electron beams must substantially converge at or near the plane of the aperture mask if proper color reproduction is to be achieved. When properly converged the three beams instantaneously illuminate only the phosphor dots included within a particular triad.

Geometry considerations in a shadow mask tube, however, are such that the three beams do not naturally converge at all points of the raster during scansion. Normally, static as well as dynamic convergence is required and to achieve such convergence it is the practice to subject the beams to auxiliary magnetic fields. Static convergence is conventionally accomplished by the use of adjustably supported permanent magnets which are mounted upon the neck of the tube. These magnets apply their flux to assigned magnetic circuits which include pole piece pairs disposed within the neck section of the tube. One such circuit is provided for each beam. The pole piece pairs typically take the form of elongated members that flank the path of its assigned electron beam to direct the field of the magnet across the path of the beam.

Dynamic convergence, on the other hand, is obtained by resort to electromagnetic apparatus which also directs magnetic flux into the internal pole pieces. These electromagnets are energized by correction signals derived from the horizontal and vertical deflection circuits. The electromagnetic apparatus, as well as the permanent magnets are mounted on a common yoke which is adjustably positionable about the neck of the tube. A typical prior art electromagnetic convergence device comprises a U-shaped core having a vertical and a horizontal convergence winding mounted on each leg of the core. The core includes a nonmagnetic gap across which the permanent magnet for static convergence is adjustably supported. In this fashion the flux field of the magnet is applied by the core to the internal pole pieces to statiscally converge the electron beams.

Permanent magnets, however, are particularly susceptible to temperature changes. Specifically, the flux density of a permanent magnet varies inversely with ambient temperature i.e., the flux density is reduced significantly with a rise in ambient. Accordingly, a change in temperature, whether a rise or fall, that alters the flux density of the magnet will render a previously established beam convergence unsuitable.

Thus a particularly vexing problem in present convergence apparatus is the deterioration in convergence after the color receiver has been operating for a period of time. Beam convergence, which is a factory adjustment, is accurate so long as the ambient within the receiver does not depart significantly from the temperature at which convergence was established, for example, if convergence is performed when the receiver is relatively cool, say after 5 to 10 minutes of operation, then the receiver can be expected to become misconverged as the ambient within the receiver rises after prolonged viewing. On the other hand, if convergence is performed at the factory after the receiver has been thoroughly warmed up then the receiver will be misconverged until such time as the ambient in the receiver reaches the temperature at which the receiver was converged. Thus, it is seen that, irrespective of when the convergence adjustment is performed on the receiver, periods of improper beam convergence are unavoidable.

Until the advent of the subject invention, the problem of static misconvergence attributable to temperature sensitivity of permanent magnets has been resolved by compromise, that is, a degree of misconvergence was tolerated at low operating temperatures on the premise that a more accurate convergence would obtain after the receiver was thoroughly warmed up. Another solution suggested forming the magnets from special alloys that have a relatively stable flux density versus temperature characteristic. The cost of these materials, however, make their use prohibitive in home entertainment equipment.

SUMMARY OF THE INVENTION

It is therefore a general object of the invention to provide an improved static convergence apparatus for use with a multibeam color-reproducing cathode-ray tube.

It is a particular object of the invention to provide a temperature-compensated magnetic apparatus for achieving static convergence in a multibeam color cathode-ray tube.

It is also an object of the invention to provide a temperature-compensated convergence apparatus which overcomes the shortcomings of prior art practices.

In accordance with the invention a temperature-compensated static convergence apparatus for establishing and maintaining a substantially constant magnetic flux field across a path traversed by a electron beam in a multibeam color reproducing cathode-ray tube comprises a primary magnetic flux circuit for directing a field of magnetic flux across the electron beam path. A permanent magnet having a flux density that varies inversely with temperature serves to apply a field of magnetic flux to the primary flux circuit. A flux-permeable compensating member have a permeability that varies inversely with temperature is disposed in magnetic coupling relation to the magnet and constitutes a flux loading circuit for diverting a portion of the magnetic flux of the magnet from the primary flux circuit. The magnet and the compensating member collectively establish, at a given ambient temperature, a resultant magnetic flux field of predetermined strength through the primary circuit and across the electron beam path. In this arrangement, therefore, a departure in ambient from the aforesaid given temperature that effects a change in the flux density of the magnet, and thus the magnet's flux contribution to the primary circuit, simultaneously effects a variation in the permeability of the compensating member to produce a corresponding offsetting change in the loading effect of the compensating member upon the flux field of the magnet thereby maintaining the resultant magnetic flux field across the beam path at the predetermined strength.

BRIEF DESCRIPTION OF THE DRAWINGS

The features of the invention which are believed to be novel are set forth with particularity in the appended claims. The invention, together with further objects and advantages thereof, may best be understood however by reference to the following description taken in conjunction with the accompanying drawings, in the several figures of which like reference numerals identify like elements, and in which:

FIG. 1 is an elevational view, partly in section, of a temperature-compensated convergence apparatus positioned upon the neck of a tribeam cathode-ray tube;

FIG. 2 is an exploded view, partly in section, of a portion of the apparatus shown in FIG. 1 more clearly illustrating the temperature-compensating member for the static convergence magnet; and FIGS. 3A–3D depict a series of alternate arrangements for compensating the static convergence magnet.

DESCRIPTION OF THE PREFERRED EMBODIMENT

The convergence assembly 10 embodying the invention is depicted in FIG. 1. As there shown, apparatus 10 is mounted upon the neck 11 of a tribeam cathode-ray tube of the type generally employed in color television receivers. In color-reproducing tubes of this type, the longitudinal axis of neck 11 is coincident with the geometric axis of the tube itself. A trio of electron guns (not shown) are symmetrically disposed about this axis for developing the electron beams B, R, G. Supported within the neck section of the tube and extending radially from the tube axis are pairs of elongated ferromagnetic pole pieces 13, 14 and 15. These pole pieces, which are spaced about the tube axis on 120° centers, present outer face pairs 13', 14' and 15' to magnetic apparatus housed within convergence assembly 10, which apparatus will be more fully described below. The inner extremities 13'', 14'' and 15'' of these pole pieces flank the paths of electron beams B, R and G, respectively, for substantially the entire length of the pole pieces. A Y-shaped magnetic shield 16 is interposed between the internal pole pieces to prevent interaction between the magnetic fields developed across the pole pieces.

It is appreciated, of course, that the disclosed delta gun array is not employed in all multibeam color reproducing cathode-ray tubes. One alternative construction, for example, contemplates an in-line or planar gun array. In such a construction a pole piece pair for the centrally disposed beam may be unnecessary.

Convergence assembly 10 is of an interlocking tripartite construction comprising three substantially identical equally spaced housings 17, 18, 19. As best seen in FIG. 1, each of the housings is formed with an arcuate lower wall section having a curvature conforming to the wall of tube neck 11. A clamp of conventional construction, not shown, secures assembly 10 at a desired location upon tube neck 11, that is, with each of housings 17, 18 and 19 positioned over an assigned one of pole pairs 13, 14, 15, respectively.

Each of the housings contains identical structure for statically, as well as dynamically, converging its assigned beam, therefore, discussion will be confined to a consideration of housing 17, the structure of which is detailed for this purpose. Accordingly, and as is apparent from FIGS. 1 and 2, housing 17 takes the form of a shell which encloses a convergence device 21 that includes a temperature-compensated static convergence apparatus for establishing and maintaining a substantially constant magnetic flux field across pole pieces 13 in the neck of the cathode-ray tube. To this end device 21 includes a primary magnetic flux circuit comprising a core 22 for directing a field of magnetic flux across pole pieces 13. Core 22, which is formed by a pair of L-shaped legs 23 to give the core a U-shaped configuration, preferably is constituted of a high-permeability material such as ferrite although other high-permeability materials are also suitable. The core is secured in housing 17 by inserting the free ends 24 of legs 23 in pockets 25 formed in the lower part of the housing. Mounted in this fashion, the ends of the core legs, which are canted to accommodate the curvature of the tube neck 11, confront the outer faces 13' of the pole pieces flanking electron beam B. The other extremities of the core legs form the bight portion of core 22 and are spaced apart to establish a nonmagnetic gap 26.

Insofar as dynamic convergence of the beams is concerned, it is sufficient to note that core 22 is also utilized for that function. Specifically, a horizontal convergence winding 35 and an overlying vertical convergence winding 36 are mounted on each of core legs 23. The end turns of each horizontal winding are serially connected in a flux-aiding relation as are the end turns of each vertical convergence winding. The free ends of windings 35 and 36 then are returned, respectively, to horizontal and vertical deflection circuits, not shown, for energization in a known manner.

Individually associated with each of housings 17, 18 and 19 is a static convergence bipolar permanent magnet 28, preferably of circular configuration and magnetized across a diameter thereof, for applying a field of magnetic flux to core 22. Magnet 28 is constructed of an economical readily obtained ferrite material, such as the type employed in prior art static convergence magnets, that is, magnet material having a flux density characteristic that varies inversely with temperature. Magnet 28 is rotatably supported between the bight portion of core 22 and a resilient bow piece 29 that forms the upper wall of housing 19, preferably across nonmagnetic gap 26, to permit adjusting the magnitude of flux applied to the core. Bow 29 has a depending post 30 which is received in a bore 31 in the magnet to permit rotatably captivating the magnet between the bow and the core, see FIG. 2.

Interposed between the magnet and the core is a flux-permeable temperature-compensating disc-shaped member 32 which has a permeability that varies inversely with temperature. Positioned adjacent the magnet, compensator disc 32 effects a magnetic coupling relation to the magnet to constitute a flux loading or shunting circuit that diverts a portion of the magnetic flux of the magnet from core 22. Thus, at a given ambient temperature, magnet 28 and compensator 32 collectively establish a resultant magnetic flux field of a predetermined strength through core 22.

The compensator is dimpled to form a conical boss 33 which also extends into bore 31 of the magnet. Desirably, disc 32 is also dished so that when it is compressed between the core and magnet a springlike bias is provided that facilitates its retention therebetween. Arranged thus, the compensator disc tends to remain stationary when the magnet is rotated. It is immaterial, however, whether the compensator remains stationary or rotates with the magnet since its shunting effect upon the magnet remains substantially the same so long as it continues to overlie the same surface area of the magnet.

In operation, convergence assembly 10 is mounted upon the neck of the picture tube and positioned so that housings 17, 18 and 19 overlie internal pole piece pairs 13, 14 and 15, respectively. As previously indicated, each of the electron beams passes between the confronting inner extremities of an assigned pole piece pair. The resultant magnetic field established by magnet 28 and conpensator 32 extends across the ends 13'' of pole pieces 13 and is oriented substantially perpendicular to the trajectory of the beam thus producing a lateral deflection of the beam which is proportional to the strength of the impressed field. By controlling the strength of the magnetic field the trajectory of the blue beam, in this instance, is altered so that it converges with the red and green beams at a given point on the tube screen.

Since the subject invention is principally concerned with static convergence, a discussion of dynamic convergence operation is omitted. Accordingly, and again directing attention principally to housing 17, the orientation of the field of magnet 28 relative to core 22 determines the magnitude, as well as the direction, of the magnetic flux field applied to the core by the magnet. It must be appreciated that in statically converging a color receiver there is a degree of interaction between the fields applied to the three beams. Therefore, static convergence requires a sequential adjustment of each of the magnets in housings 17, 18 and 19, while observing a cross-hatch pattern displayed on the viewing screen, until the desired degree of convergence is attained.

Assume now, for purposes of illustration, that static convergence of the beams was performed when the ambient temperature in the receiver was $T_1$. Depending upon the type of material in the magnet, magnet 28 exhibited a particular value of flux density at $T_1$. At this temperature the permeability of compensating disc 31 also was of a particular value. Accordingly, at temperature $T_1$ the shunting effect of the compensator upon the magnet caused a resultant magnetic flux field of a predetermined strength to be applied, via core 22, across pole pieces 13''.

Subsequently, after the receiver has been operating for an extended period and the ambient temperature has risen to $T_2$, the flux density of magnet 28 diminishes as does the permeability of compensator disc 31. Therefore, while the reduction in magnet flux density reduces the amount of magnetic flux available to core 22, the decrease in compensator permeability at $T_2$ effects a substantially corresponding offsetting change in the loading or shunting effect of the compensator upon the flux field of the magnet. As a result, the magnet flux field across pole pieces 13'' is maintained at the predetermined strength established at $T_1$ and the blue beam B, in this case, remains in its originally converged position.

While the above illustration considered the effects of a rise in ambient temperature upon the static convergence apparatus, it should be readily apparent that if the electron beams were converged at an elevated temperature and, subsequently, the receiver was operated at a lower ambient, then compensation would still obtain. For example, at an elevated temperature $T_4$ the flux density of the magnet, as well as the permeability of the compensator assume specific values. Thereafter, should the ambient decrease to temperature $T_3$, while the flux density of the magnet will increase, the permeability and, of course, the loading effect, of the compensator will also increase so that the resultant magnetic field applied to the core still remains at a substantially constant predetermined strength.

Merely by way of illustration and in no sense by way of limitation, a static convergence apparatus constructed in accordance with the invention, and successfully operated in an embodiment of the convergence assembly shown in FIGS. 1 and 2, employed a permanent magnet exhibiting a nominal flux density of 11 gauss when measured with a Bell Model 620 Gauss meter having a Bell Model T-6010 probe at the beam center of a convergence barrel of the type used in a 25AZP22 color picture tube. Compensator 32 was fabricated of an 0.015 inch thick alloy product of Simonds Saw and Steel Division (Wallace-Murray Corporation, Fitchburg, Massachusetts) formed in a 3/8 inch diameter disc. This material, which is designated Heat No. 8074 by Simonds Saw and Steel, is a ferrite alloy comprising approximately 29.75 percent nickel.

DESCRIPTION OF ALTERNATE EMBODIMENTS

While the embodiment shown in FIG. 2 has actually been constructed and operated, it should be appreciated that the compensating member need not be sandwiched between the magnet and the core in the manner shown in order to achieve the desired result. Specifically, it is only necessary that the compensating member be disposed in a magnetic coupling relation with the magnet so as to constitute a flux loading or shunting circuit for diverting a portion of the magnet flux from the core. To this end, and as illustrated in FIGS. 3A-3D, a variety of magnetcompensator arrangements can be resorted to.

In FIG. 3A, for example, the compensator disc 32A is positioned atop the magnet and, as shown can include tab portions 32T to facilitate a more effective coupling to the magnet. FIG. 3B depicts a compensator 32B secured beneath the bight portion of the core, while FIG. 3C shows a band-type compensator 32C encircling the bight portion of the core. Finally, as shown in FIG. 3D, a compensating member 32D can be inserted between the magnet and the core without necessarily bridging the nonmagnetic gap of the core.

In each of the FIGS. 3A-3D embodiments the compensating member effects the same result as that described for the FIG. 2 embodiment. A change in temperature that changes the flux contribution of the magnet to the core also alters the permeability of the compensating member so that a substantially corresponding offsetting change in the loading effect of the compensator upon the flux field of the magnet is effected. As a result, the magnetic flux field applied across the beam path is maintained at a predetermined strength.

While particular embodiments of the invention have been shown and described, modifications may be made, and it is intended in the appended claims to cover all such modifications as may fall within the true spirit and scope of the invention.

We claim:

1. A temperature-compensated static convergence apparatus for establishing and maintaining a substantially constant magnetic flux field across a path traversed by an electron beam in a multibeam color-reproducing cathode-ray tube, said apparatus comprising:
   a primary magnetic flux circuit for directing a field of magnetic flux across said electron beam path;
   a permanent magnet for applying a field of magnetic flux to said primary flux circuit, said magnet having a flux density that varies inversely with temperature;
   and a flux-permeable compensating member having a permeability that varies inversely with temperature disposed in magnetic coupling relation to said magnet and constituting a flux loading circuit for diverting a portion of the magnetic flux of said magnet from said primary flux circuit,
   said magnet and said member collectively establishing, at a given ambient temperature, a resultant magnetic flux field of predetermined strength through said primary circuit and across said electron beam path,
   whereby a departure from said given temperature that effects a change in the flux contribution of said magnet to said primary circuit simultaneously alters the permeability of said compensating member so as to effect a substantially corresponding offsetting change in the loading effect of said member upon the flux field of said magnet thereby maintaining the resultant magnetic flux field across said electron beam path at said predetermined strength.

2. A temperature-compensated static convergence apparatus set forth in claim 1 in which said cathode-ray tube includes a pair of ferromagnetic pole pieces flanking the electron beam path and in which said primary magnetic flux circuit comprises a core of magnetic material having a pair of depending legs for directing said field of magnetic flux across said pole pieces.

3. A temperature-compensated static convergence apparatus as set forth in claim 2 in which said magnetic core includes a nonmagnetic gap and said permanent magnet is rotatably supported adjacent to said gap and said flux-permeable compensating member is interposed between said magnet and said gap portion of said core.

* * * * *